(12) United States Patent
Kamp et al.

(10) Patent No.: US 9,476,515 B2
(45) Date of Patent: Oct. 25, 2016

(54) CHECK VALVE HOUSING

(71) Applicant: HAMILTON SUNDSTRAND CORPORATION, Windsor Locks, CT (US)

(72) Inventors: Josh Kamp, Glastonbury, CT (US); Feng Feng, South Windsor, CT (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 50 days.

(21) Appl. No.: 14/452,572

(22) Filed: Aug. 6, 2014

(65) Prior Publication Data

US 2016/0040799 A1 Feb. 11, 2016

(51) Int. Cl.
*F16K 15/03* (2006.01)
*F16K 27/02* (2006.01)

(52) U.S. Cl.
CPC ........... *F16K 27/0209* (2013.01); *F16K 15/03* (2013.01); *Y10T 137/7839* (2015.04); *Y10T 137/7898* (2015.04)

(58) Field of Classification Search
CPC .................. F16K 15/038; F16K 15/03; Y10T 137/7898; Y10T 137/7839
USPC ............................................. 137/512.1, 527
See application file for complete search history.

(56) References Cited

U.S. PATENT DOCUMENTS

| 7,493,770 | B2 | 2/2009 | Christianson et al. |
| 8,181,669 | B2 | 5/2012 | Dehais et al. |
| 2010/0282340 | A1 | 11/2010 | Dehais et al. |
| 2013/0233412 | A1* | 9/2013 | Moren ............... F16K 15/03 137/527.8 |
| 2013/0340862 | A1 | 12/2013 | Kamp et al. |

* cited by examiner

*Primary Examiner* — Craig Schneider
*Assistant Examiner* — P. Macade Nichols
(74) *Attorney, Agent, or Firm* — Cantor Colburn LLP

(57) ABSTRACT

A check valve housing for a check valve is provided and includes check valve housing body. First and second hinge supports extend from the check valve housing body. A stop is coupled to the first and second hinge supports. The first hinge support includes a first hinge pin interface having a first hinge pin hole to receive a hinge pin. A ratio of a diameter of the first hinge pin hole to a thickness of the first hinge pin interface is between 2.44 and 2.66.

10 Claims, 6 Drawing Sheets

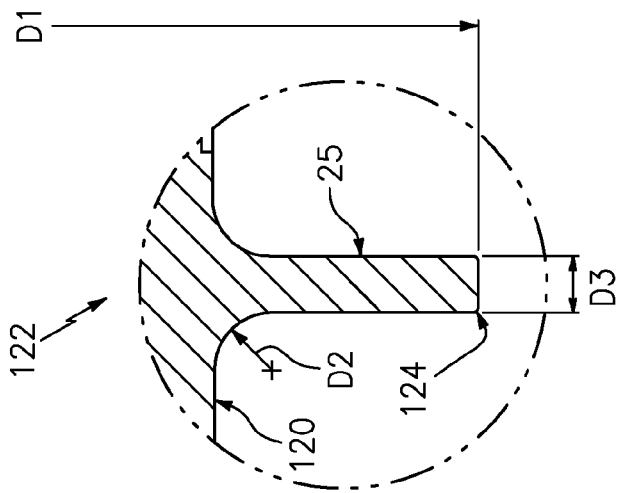
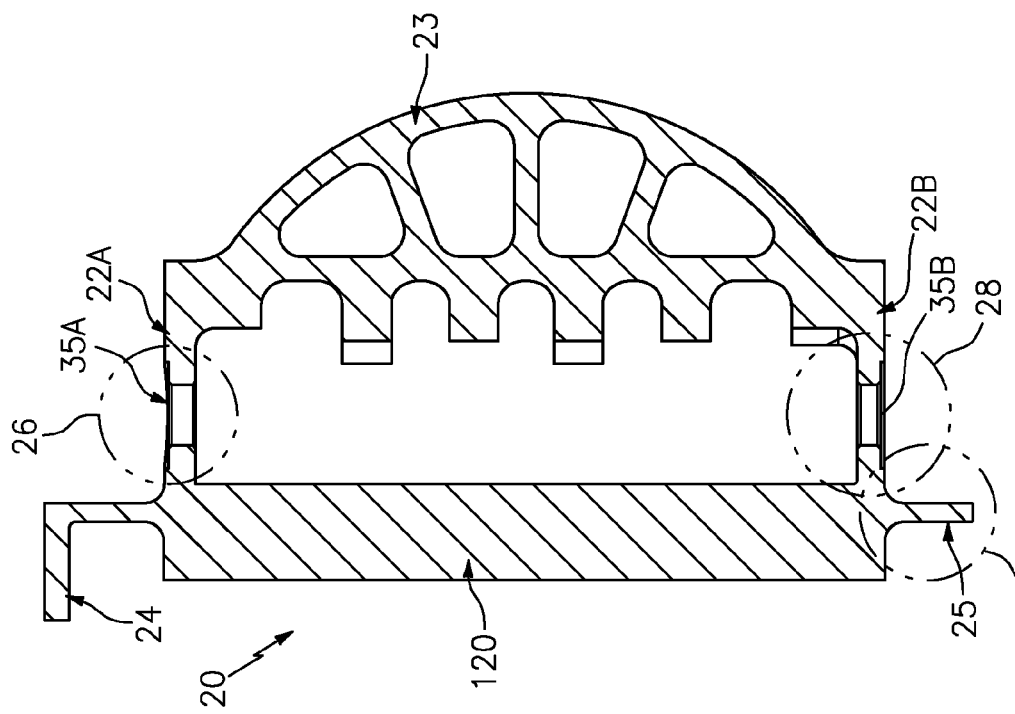

CHECK VALVE HOUSING

BACKGROUND OF THE INVENTION

The subject matter disclosed herein relates to a check valve and, more particularly, to a housing for a check valve.

In bleed systems where fluid pressure can be tapped off from either a high pressure stage compressor or a low pressure stage compressor, a check valve is needed to prevent the high pressure stage bleed air from backflowing into the low pressure stage compressor. This check valve often includes flappers that occupy closed positions when the high pressure stage bleed air has a higher pressure than the low pressure stage compressor, whereby the high pressure stage bleed air is prevented from backflowing into the low pressure stage compressor. These flappers open when the pressure of the low pressure stage compressor exceeds that of the high pressure stage bleed air.

When the flappers open, they often pivot at a relatively high angular velocity about a hinge pin and impact the check valve housing, which is normally provided with a compliant stop. Opposite sides of the compliant stop form contact areas with each of the flappers that are each limited in size and their respective ability to absorb the impacts. An interface between the hinge pin and the flappers, as well as an interface between the hinge pin and the check valve housing, are also subject to fatigue wear as opening and closing cycles of the flappers pivoting about the hinge pin are repeated over a period of time. Structurally withstanding the high opening velocities and the repeated impacts between the compliant stop and the flappers has, thus, proven to be challenging.

BRIEF DESCRIPTION OF THE INVENTION

According to one aspect of the invention, a check valve housing for a check valve is provided and includes check valve housing body. First and second hinge supports extend from the check valve housing body. A stop is coupled to the first and second hinge supports. The first hinge support includes a first hinge pin interface having a first hinge pin hole to receive a hinge pin. A ratio of a diameter of the first hinge pin hole to a thickness of the first hinge pin interface is between 2.44 and 2.66.

According to another aspect of the invention, a. method of assembling a check valve is provided and includes arranging a first check valve flapper opposite a second check valve flapper. The first and second check valve flappers are aligned with a first hinge support and a second hinge support of a check valve housing. The check valve housing includes a check valve housing body. The first and second hinge supports extend from the check valve housing body. A stop is coupled to the first and second hinge supports. The first hinge support includes a first hinge pin interface having a first hinge pin hole to receive a hinge pin. A ratio of a diameter of the first hinge pin hole to a thickness of the first hinge pin interface is between 2.44 and 2.66. The hinge pin is inserted through the first hinge support, through the first and second check valve flappers, and through the second hinge support.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 5 is a sectional view of a check valve housing according to an embodiment;

FIG. 6 is a sectional view of a check valve flange of the check valve housing of FIG. 5 according to an embodiment;

The detailed description explains embodiments of the invention, together with advantages and features, by way of example with reference to the drawings.

DETAILED DESCRIPTION OF THE INVENTION

In accordance with aspects of the invention, a check valve is provided for use in bleed systems, for example. In such bleed systems, pressures can be tapped off from either a high pressure stage ("high stage") compressor or a low pressure stage ("low stage") compressor. The check valve serves to prevent high stage bleed air from backflowing into the low stage compressor and can withstand high opening and closing velocities of check valve flappers.

Figure 1:
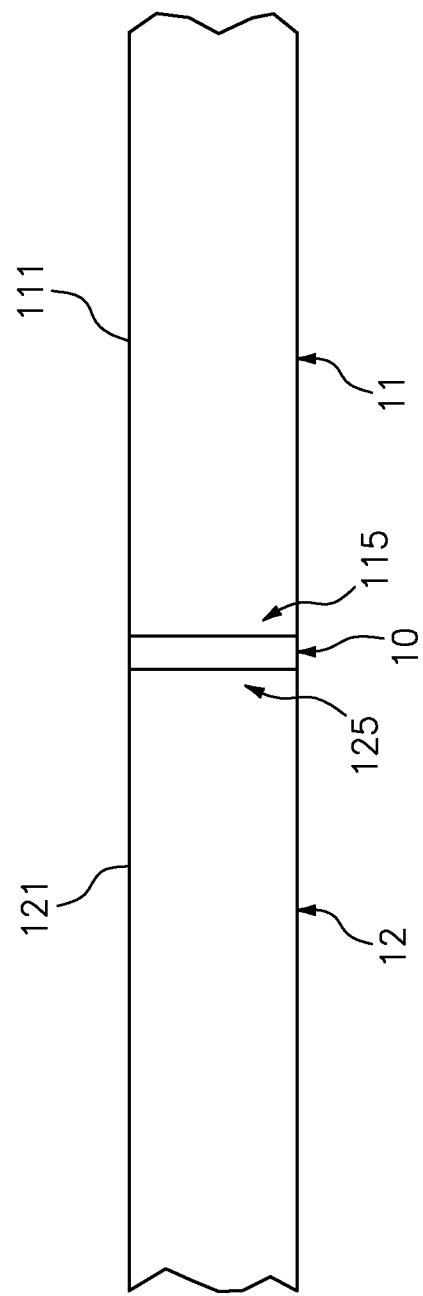
FIG. 1 is a schematic view of a check valve interposed between duct assemblies according to an embodiment.

With reference to FIGS. 1-4, a check valve 10 is provided. The check valve 10 is interposed between upstream ductwork 11 and downstream ductwork 12. As shown in FIG. 1, the upstream ductwork 11 is formed of a single duct assembly 111 and the downstream ductwork 12 is similarly formed of a single duct assembly 121. This configuration is, of course, exemplary, and it is to be understood that alternate configurations are possible, such as multiple upstream and/or downstream duct assemblies coupled to the check valve 10.

Figure 2:
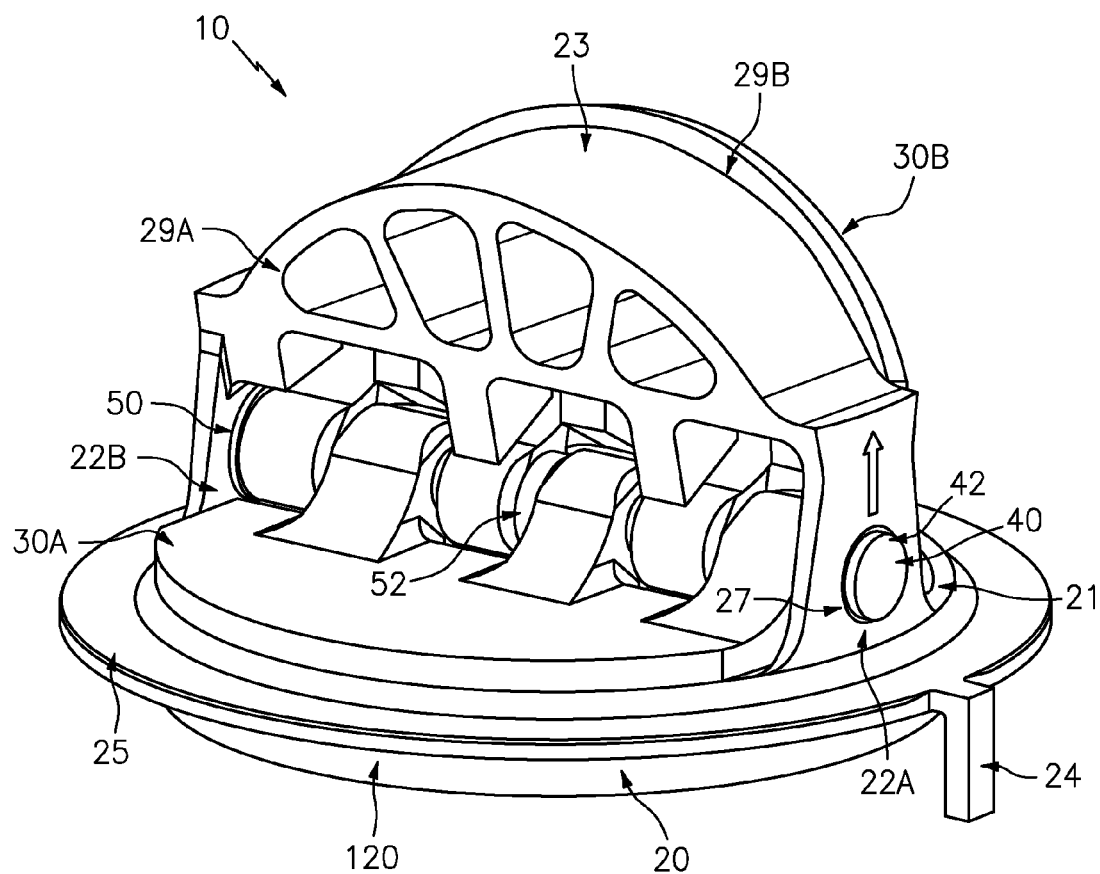
FIG. 2 is a perspective view of a check valve according to an embodiment.

As shown in FIG. 2, the check valve 10 includes a check valve housing 20 and first and second check valve flappers 30A and 30B. The first and second check valve flappers 30A and 30B can share a common design. The check valve housing 20 includes a check valve housing body 120 having a seat 21, a first and second hinge support 22A and 22B, and a stop 23. The seat 21 is annularly shaped and is formed to define an aperture 100 (see FIG. 3) that extends axially from an upstream end of the seat 21, which is associated with the upstream ductwork 11, to a downstream end of the seat 21, which is associated with the downstream ductwork 12. In accordance with embodiments, the seat 21 may be configured to fit onto the upstream ductwork 11 and the downstream ductwork 12 such that the seat 21 is fluidly interposed between an aft end 115 (see FIG. 1) of the upstream ductwork 11 and a complementary forward end 125 (see FIG. 1) of the downstream ductwork 12. The check valve housing 20 may also include a tab 24 that extends from a check valve flange 25 to ensure that the check valve 10 is installed in the proper position and direction relative to the upstream ductwork 11 and the downstream ductwork 12. The check valve flange 25 provides a mating interface with the upstream ductwork 11 and the downstream ductwork 12.

The first and second hinge supports 22A and 22B are coupled to opposite ends of the stop 23. The first and second hinge supports 22A and 22B provide support for a hinge pin 40 at respective first and second hinge pin interfaces 26 and 28 (see FIG. 4). When installed, the hinge pin 40 has a central pivot axis CP (see FIG. 4) disposed to bifurcate the aperture 100 defined by the seat 21 to thereby further define a pair of openings 101 (see FIG. 3). The first hinge support 22A is configured to receive a hinge pin head 42 of the hinge pin 40, for instance, by inclusion of a counterbore 27. A locking pin 43 (see FIG. 4) can be installed in the hinge pin 40 proximate the second hinge support 22B to assist in holding the hinge pin 40 in a fixed position relative to the check valve housing 20.

Figure 4:
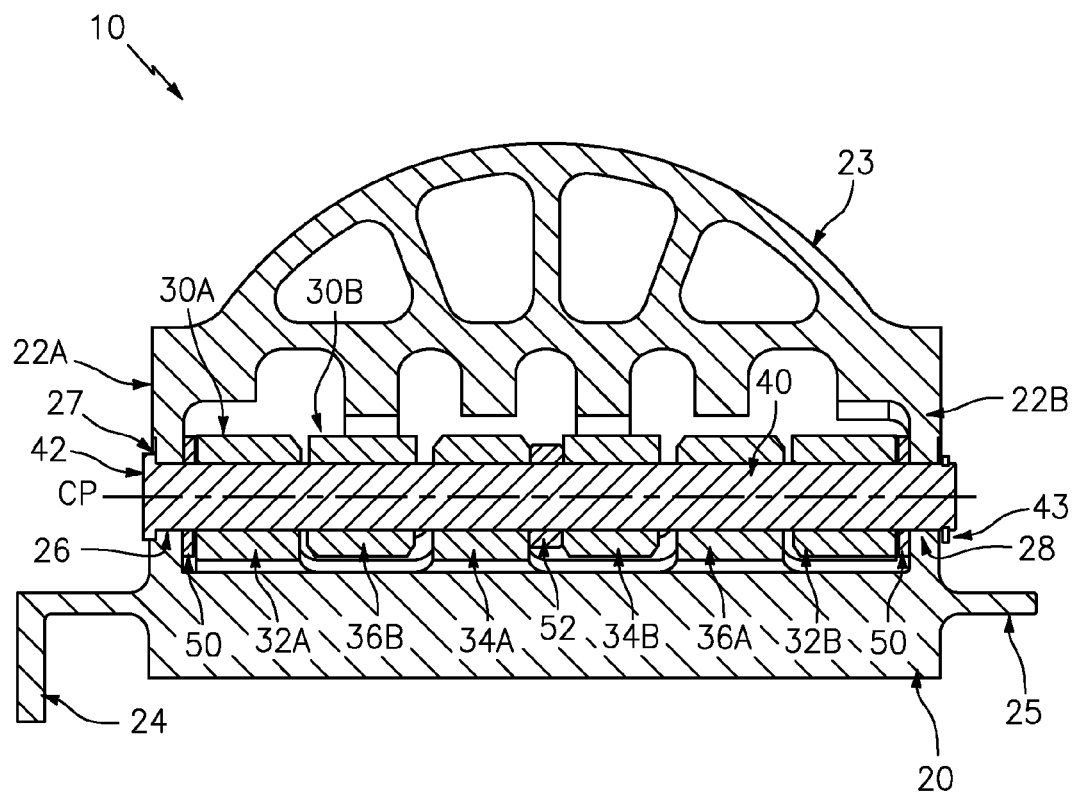
FIG. 4 is a sectional view of the check valve of FIG. 2 according to an embodiment.

The first and second check valve flappers 30A and 30B are pivotably coupled to the hinge pin 40 as depicted in FIG. 4. A pair of end spacers 50 on the hinge pin 40 separate the first and second check valve flappers 30A and 30B from the first and second hinge supports 22A and 22B. A middle spacer 52 on the hinge pin 40 separates the first and second check valve flappers 30A and 30B from each other. The first and second check valve flappers 30A and 30B are arranged in a 180 degree opposite orientation relative to each other such that a lower ear 32A of the first check valve flapper 30A is adjacent to an end spacer 50 and an upper ear 36B of the second check valve flapper 30B on the hinge pin 40. A middle ear 34A of the first check valve flapper 30A is adjacent to the upper ear 36B of the second check valve flapper 30B and the middle spacer 52 on the hinge pin 40. A middle ear 34B of the second check valve flapper 30B is adjacent to the middle spacer 52 and an upper ear 36A of the first check valve flapper 30A on the hinge pin 40. A lower ear 32B of the second check valve flapper 30B is adjacent to the upper ear 36A of the first check valve flapper 30A and an end spacer 50 on the hinge pin 40.

Figure 3:
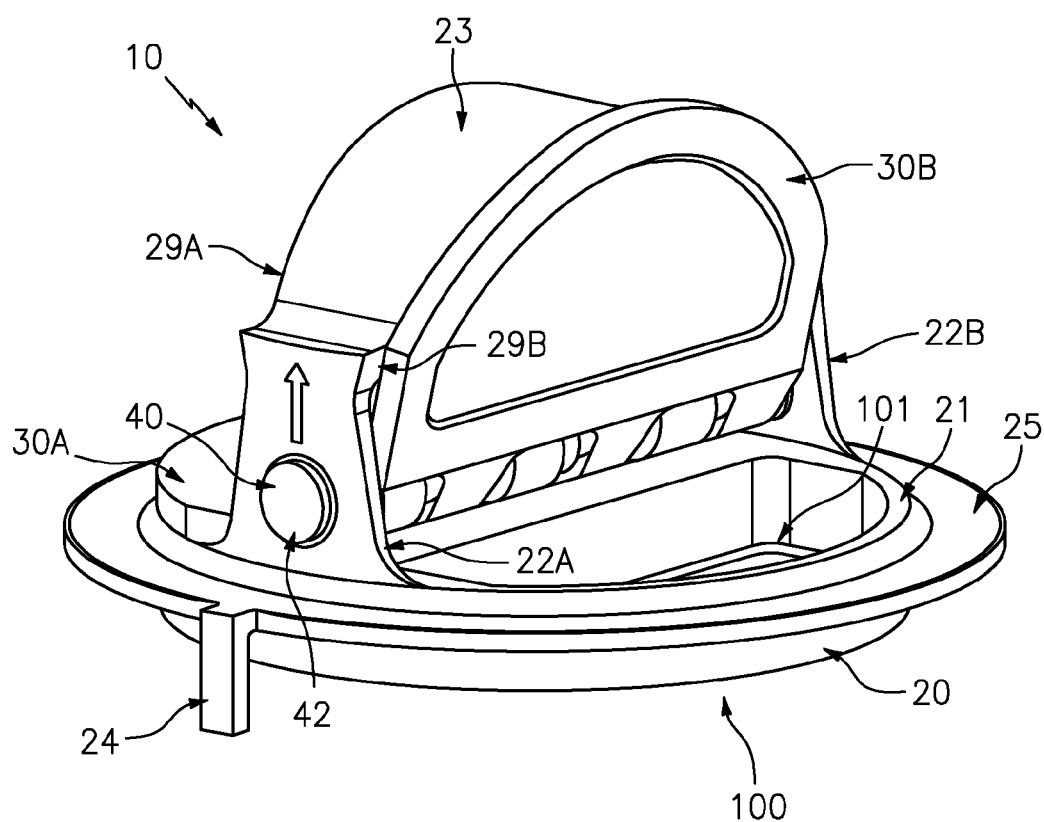
FIG. 3 is another perspective view of the check valve of FIG. 2 according to an embodiment.

The first and second check valve flappers 30A and 30B pivot about the central pivot axis CP in response to a fluid pressure differential between fluid disposed within the upstream ductwork 11 (i.e., high stage bleed fluid) and fluid disposed in the downstream ductwork 12 (i.e., fluid in the low stage compressor). In particular, the first and second check valve flappers 30A and 30B are configured to pivot from respective closed positions at which the first and second check valve flappers 30A and 30B prevent fluid flow through the openings 101 to respective open positions at which fluid flow through the openings 101 is permitted. In the example of FIGS. 2 and 3, the first check valve flapper 30A is depicted in a closed position, and the second check valve flapper 30B is depicted in an open position.

The stop 23 of the check valve housing 20 has first and second opposite sides 29A and 29B. The first side 29A is associated with the first check valve flapper 30A, while the second side 29B is associated with the second check valve flapper 30B. When the first and second check valve flappers 30A and 30B are disposed in the respective closed positions, the first and second check valve flappers 30A and 30B are displaced from the first and second sides 29A and 29B. When the first and second check valve flappers 30A and 30B pivot to the respective open positions, the first and second check valve flappers 30A and 30B impact and make contact with the first and second sides 29A and 29B, respectively.

FIG. 5 is a sectional view of the check valve housing 20 according to an embodiment. The first and second hinge supports 22A and 22B extend from the check valve housing body 120 of the check valve housing 20 and are coupled to the stop 23. As depicted in FIG. 5, the first hinge support 22A includes the first hinge pin interface 26 which has a first hinge pin hole 35A to receive the hinge pin 40 of FIGS. 2-4. The second hinge support 22B includes the second hinge pin interface 28 having a second hinge pin hole 35B to receive the hinge pin 40 of FIGS. 2-4. The check valve flange 25 extends from the check valve housing body 120 at a flange interface 122. The tab 24 may extend beyond an outer diameter of the check valve flange 25.

FIG. 6 is a sectional view of the check valve flange 25 of the check valve housing 20 at the flange interface 122 according to an embodiment. The check valve flange 25 has an outer edge 124. In an embodiment, the outside diameter D1 of the check valve flange 25 at the outer edge 124 is about 4.588 inches (11.654 cm). In an embodiment, a radius of curvature D2 between the check valve housing body 120 and the check valve flange 25 at the flange interface 122 is about 0.10 inches (0.254 cm). In an embodiment, a thickness D3 of the check valve flange 25 is about 0.10 inches (0.254 cm). A ratio of the outside diameter D1 of the check valve flange 25 to the radius of curvature D2 between the check valve housing body 120 and the check valve flange 25 at the flange interface 122 is between 43.66 and 48.32. A ratio of the outside diameter D1 of the check valve flange 25 to the thickness D3 of the check valve flange 25 is between 44.73 and 47.08.

Figure 7:
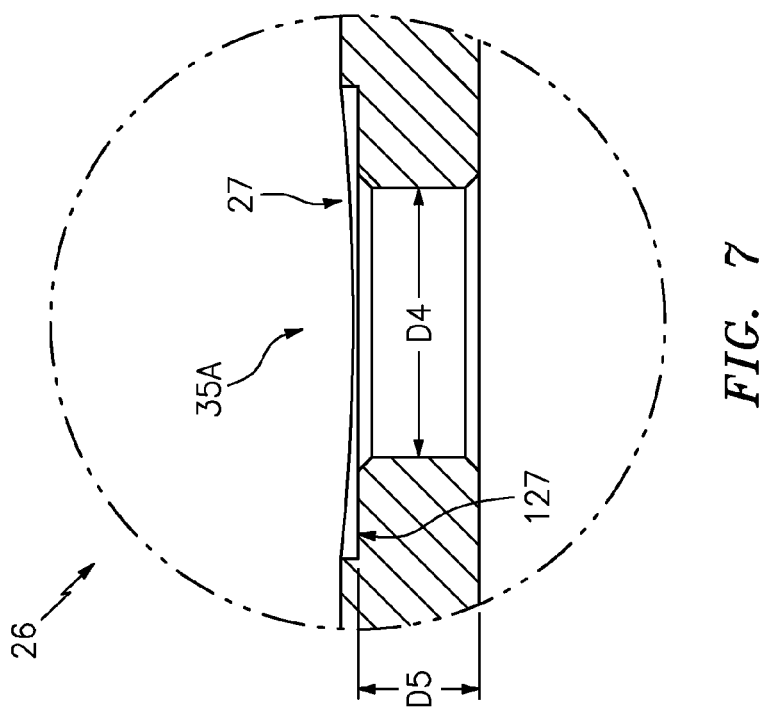
FIG. 7 is a sectional view of a first hinge pin interface of the check valve housing of FIG. 5 according to an embodiment.

FIG. 7 is a sectional view of the first hinge pin interface 26 of the check valve housing 20 of FIG. 5 according to an embodiment. In an embodiment, the first hinge pin hole 35A has a diameter D4 of about 0.3185 inches (0.8090 cm). The first hinge pin hole 35A may be sized to press fit the hinge pin 40 of FIGS. 2-4 through the first hinge pin hole 35A. The first hinge pin interface 26 has a thickness D5 of about 0.128 inches (0.325 cm). The thickness D5 may be defined relative to a base surface 127 of the counterbore 27, where the counterbore 27 receives the hinge pin head 42 of the hinge pin 40 of FIGS. 2-4. A ratio of the diameter D4 of the first hinge pin hole 35A to the thickness D5 of the first hinge pin interface 26 is between 2.44 and 2.66.

Figure 8:
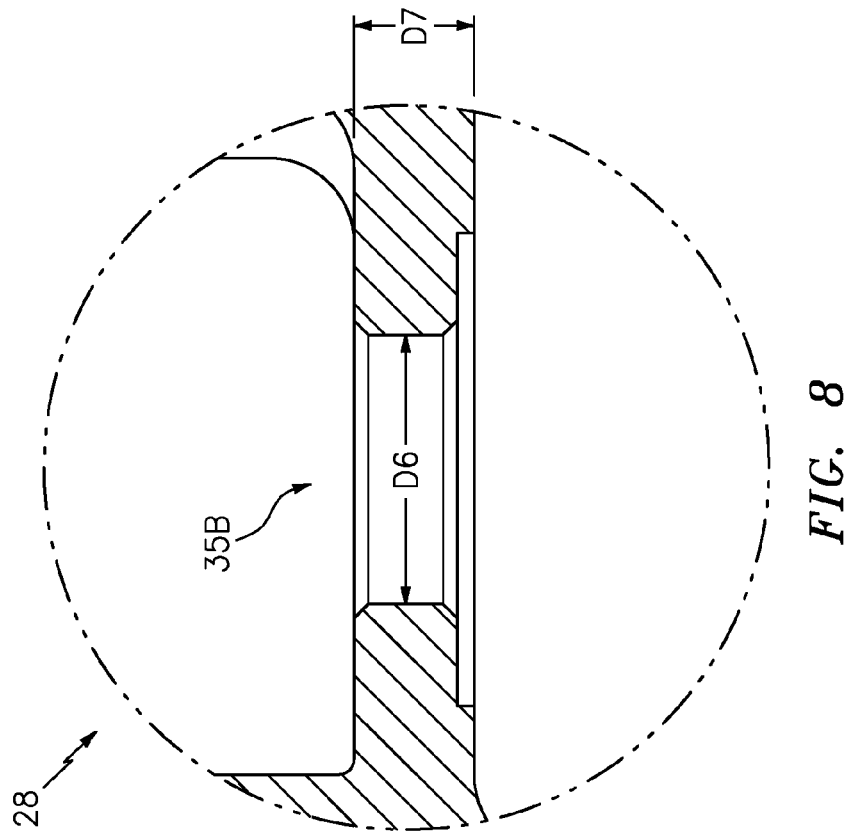
FIG. 8 is a sectional view of a second hinge pin interface of the check valve housing of FIG. 5 according to an embodiment.

FIG. 8 is a sectional view of the second hinge pin interface 28 of the check valve housing 20 of FIG. 5 according to an embodiment. In an embodiment, the second hinge pin hole 35B has a diameter D6 of about 0.3135 inches (0.7963 cm). The second hinge pin hole 35B may be sized for a slight clearance fit of the hinge pin 40 of FIGS. 2-4 through the second hinge pin hole 35B. The second hinge pin interface 28 has a thickness D7 of about 0.138 inches (0.351 cm). A ratio of the diameter D6 of the second hinge pin hole 35B to the thickness D7 of the second hinge pin interface 28 is between 2.18 and 2.37.

A method of assembling the check valve 10 is described in reference to FIGS. 1-8. The first check valve flapper 30A is arranged opposite the second check valve flapper 30B. The first and second check valve flappers 30A and 30B are aligned with the first hinge support 22A and the second hinge support 22B of the check valve housing 20. The check valve housing 20 includes the check valve housing body 120, the first and second hinge supports 22A and 22B extending from the check valve housing body 120, and the stop 23 coupled to the first and second hinge supports 22A and 22B. The first hinge support 22A includes the first hinge pin interface 26 with the first hinge pin hole 35A to receive the hinge pin 40. The second hinge support 22B includes the second hinge pin interface 28 with the second hinge pin hole 35B to receive the hinge pin 40.

The hinge pin 40 is inserted through the first hinge support 22A, through the first and second check valve flappers 30A and 30B, and through the second hinge support 22B. As previously described, a pair of end spacers 50 on the hinge pin 40 may separate the first and second check valve flappers 30A and 30B from the first and second hinge supports 22A and 22B, and a middle spacer 52 on the hinge pin 40 can separate the first and second check valve flappers 30A and 30B from each other. The hinge pin head 42 can be slightly recessed into the counterbore 27, and the hinge pin 40 secured into position by inserting locking pin 43 in the hinge pin 40 proximate the second hinge support 22B of the check valve housing 20. Tab 24 can extend from the check valve flange 25 to ensure that the check valve 10 is installed in a proper position and direction relative to upstream and downstream ductwork 11 and 12 when the check valve 10 is interposed between the upstream and downstream ductwork 11 and 12. The check valve 10 is operable to limit a fluid flow based on positioning of a first and second check valve flapper 30A and 30B to pivot about the hinge pin 40. Proper sizing of various elements of the check valve 10 can reduce stress at various interfaces and reduce the risk of premature wear and cracking related to repeated high velocity impact of the first and second check valve flappers 30A and 30B with the sides 29A, 29B of the stop 23.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A check valve housing for a check valve, comprising:
    a check valve housing body comprising a check valve flange at a flange interface;
    a tab that extends beyond an outer diameter of the check valve flange to ensure that the check valve is installed in a proper position and direction relative to upstream and downstream ductwork;
    a first and second hinge support extending from the check valve housing body; and
    a stop coupled to the first and second hinge supports, the first hinge support comprising a first hinge pin interface having a first hinge pin hole to receive a hinge pin, wherein a ratio of a diameter of the first hinge pin hole to a thickness of the first hinge pin interface is between 2.44 and 2.66 and the second hinge support comprises a second hinge pin interface having a second hinge pin hole to receive the hinge pin, wherein a ratio of a diameter of the second hinge pin hole to a thickness of the second hinge pin interface is between 2.18 and 2.37.

2. The check valve housing according to claim 1, wherein the first hinge pin interface further comprises a counterbore to receive a hinge pin head of the hinge pin, and the first hinge pin interface thickness is defined relative to a base surface of the counterbore.

3. The check valve housing according to claim 1, wherein a ratio of the outer diameter of the check valve flange to a radius of curvature between the check valve housing body and the check valve flange at the flange interface is between 43.66 and 48.32.

4. The check valve housing according to claim 1, wherein a ratio of the outer diameter of the check valve flange to a thickness of the check valve flange is between 44.73 and 47.08.

5. The check valve housing according to claim 1, wherein the check valve housing body comprises a seat that is annularly shaped and formed to define an aperture through which the check valve is operable to limit a fluid flow based on positioning of a first and second check valve flapper to pivot about the hinge pin.

6. A method of assembling a check valve, the method comprising:
    arranging a first check valve flapper opposite a second check valve flapper;
    aligning the first and second check valve flappers with a first hinge support and a second hinge support of a check valve housing, the check valve housing comprising: a check valve housing body comprising a check valve flange at a flange interface, a tab that extends beyond an outer diameter of the check valve flange to ensure that the check valve is installed in a proper position and direction relative to upstream and downstream ductwork, the first and second hinge supports extending from the check valve housing body, and a stop coupled to the first and second hinge supports, wherein the first hinge support comprises a first hinge pin interface having a first hinge pin hole to receive a hinge pin, a ratio of a diameter of the first hinge pin hole to a thickness of the first hinge pin interface is between 2.44 and 2.66, and the second hinge support comprises a second hinge pin interface having a second hinge pin hole to receive the hinge pin, wherein a ratio of a diameter of the second hinge pin hole to a thickness of the second hinge pin interface is between 2.18 and 2.37; and
    inserting the hinge pin through the first hinge support, through the first and second check valve flappers, and through the second hinge support.

7. The method according to claim 6, wherein the first hinge pin interface further comprises a counterbore to receive a hinge pin head of the hinge pin, and the first hinge pin interface thickness is defined relative to a base surface of the counterbore.

8. The method according to claim 6, wherein a ratio of the outer diameter of the check valve flange to a radius of curvature between the check valve housing body and the check valve flange at the flange interface is between 43.66 and 48.32.

9. The method according to claim 6, wherein a ratio of the outer diameter of the check valve flange to a thickness of the check valve flange is between 44.73 and 47.08.

10. The method according to claim 6, wherein the check valve housing body further comprises a seat that is annularly shaped and formed to define an aperture through which the check valve is operable to limit a fluid flow based on positioning the first and second check valve flapper to pivot about the hinge pin.

* * * * *